US012691946B2

(12) United States Patent (10) Patent No.: US 12,691,946 B2

Morimoto et al. (45) Date of Patent: Jul. 28, 2026

(54) UPPER VEHICLE-BODY STRUCTURE OF VEHICLE

(71) Applicant: MAZDA MOTOR CORPORATION, Hiroshima (JP)

(72) Inventors: Makoto Morimoto, Aki-gun (JP); Daisuke Kiyoshita, Aki-gun (JP); Shuang Gao, Aki-gun (JP); Kohichi Tanimoto, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 385 days.

(21) Appl. No.: 18/490,331

(22) Filed: Oct. 19, 2023

(65) Prior Publication Data

US 2024/0149951 A1 May 9, 2024

(30) Foreign Application Priority Data

Nov. 8, 2022 (JP) ................................. 2022-179071

(51) Int. Cl.
| | |
|---|---|
| *B62D 25/06* | (2006.01) |
| *B62D 25/04* | (2006.01) |
| *B62D 27/02* | (2006.01) |

(52) U.S. Cl.
CPC ............. *B62D 25/06* (2013.01); *B62D 25/04* (2013.01); *B62D 27/023* (2013.01)

(58) Field of Classification Search
CPC ........ B62D 25/06; B62D 25/04; B62D 27/02; B62D 27/023
See application file for complete search history.

(56) References Cited

U.S. PATENT DOCUMENTS

| | | | | |
|---|---|---|---|---|
| 7,963,591 | B2 * | 6/2011 | Duguet ................. | B62D 25/06 296/203.03 |
| 11,325,653 | B2 * | 5/2022 | Rotellini .............. | B62D 27/023 |
| 11,679,816 | B2 * | 6/2023 | Fuentes ................. | B62D 25/04 296/187.12 |
| 2001/0004161 | A1 * | 6/2001 | Son ........................ | B62D 25/04 296/210 |
| 2007/0200314 | A1 * | 8/2007 | Anderson .............. | B62D 25/04 280/210 |
| 2013/0300155 | A1 * | 11/2013 | Kurokawa ............. | B62D 25/06 296/193.06 |
| 2014/0054927 | A1 * | 2/2014 | Nakamura ............. | B62D 25/04 296/193.06 |
| 2019/0144043 | A1 | 5/2019 | Inamoto et al. | |
| 2022/0041222 | A1 * | 2/2022 | Song ...................... | B60J 5/0447 |

FOREIGN PATENT DOCUMENTS

| | | | | | |
|---|---|---|---|---|---|
| CN | 209535219 | U | * | 10/2019 | |
| CN | 116620416 | A | * | 8/2023 | ............. B62D 25/02 |
| EP | 3753811 | A1 | * | 12/2020 | ............. B62D 25/04 |
| JP | 2019-089488 | A | | 6/2019 | |
| KR | 20090061895 | A | * | 6/2009 | ............. B62D 25/04 |

* cited by examiner

*Primary Examiner* — Robert E Fuller

(74) *Attorney, Agent, or Firm* — Studebaker Brackett PLLC

(57) ABSTRACT

An upper end portion of a center pillar reinforcement is fixed to a roof rail. The roof rail comprises a protrusion portion protruding in a vehicle width direction and extending in a vehicle longitudinal direction. The protrusion portion comprises a fixation portion where the upper end portion is fixed and a terminal end portion separate, in the vehicle longitudinal direction, from the center pillar reinforcement.

9 Claims, 7 Drawing Sheets

UPPER VEHICLE-BODY STRUCTURE OF VEHICLE

BACKGROUND OF THE INVENTION

The present invention relates to an upper vehicle-body structure of a vehicle which comprises a center pillar and a roof rail, to which an upper end of the center pillar is fixed.

The following structure is known. That is, it is an upper part structure of a vehicle comprising a pair of right-and-left roof rails extending in a vehicle longitudinal direction at both end portions, in a vehicle width direction, of the vehicle and a roof reinforcement connecting the pair of roof rails in the vehicle width direction, wherein when a side collision load is inputted to a center pillar which is connected to the roof rail at its upper end portion and extends downward, the side collision load is transmitted to an opposite side of the vehicle, in the vehicle width direction, to this load-input side by way of the roof reinforcement.

Herein, it is needed that this load dispersion (transmission) to the opposite side in the side collision-load's input to the center pillar occurs efficiently. However, the strength of a joint portion of the center pillar to the roof rail is generally low, and a stress tends to concentrate in this joint portion due to a rigidity difference between the center pillar and the roof rail.

Therefore, there is a concern that the roof rail may be deformed at the above-described joint portion in the collision-load's input to the center pillar and in this case the center pillar may come (move) in a cabin excessively together with the roof rail deformed.

While it may be considered that the plate thickness of the reinforcement is increased as its countermeasures, this causes an increase of the weight and cost improperly. For example, Japanese Patent Laid-Open Publication No. 2019-89488 (US2019/0144043 A1) proposes a reinforcing structure of the above-described joint portion against the collision-load's input from an outward side, in the vehicle width direction, of the vehicle.

However, since the structure of the above-described patent document reinforces the joint portion by providing plural complex beads at both the center pillar and the roof rail or by adding a particular gusset which extends from the roof reinforcement to the center pillar, there is still room for improvement in suppressing the weight and cost properly.

That is, while the above-described patent document merely discloses the reinforcing structure against the collision-load's input from the outward side in the vehicle width direction in which the joint portion is reinforced so as not to make the roof rail be broken at the joint portion, it does not refer to any technical idea at all of suppressing an upper end portion of the center pillar reinforcement from coming (moving) in the cabin excessively by properly controlling a position of bending deformation of the roof rail.

SUMMARY OF THE INVENTION

The present invention has been devised in view of the above-described matter, and an object of the present invention is to provide an upper vehicle-body structure of a vehicle which can properly suppress the center pillar reinforcement from coming in the cabin, i.e., from moving inward in the vehicle width direction excessively in a vehicle side collision, without increasing the weight and cost improperly.

The upper vehicle-body structure of the vehicle of the present invention comprises a center pillar reinforcement and a roof rail, to which an upper end portion of the center pillar reinforcement is fixed, wherein the roof rail comprises a protrusion portion protruding in a vehicle width direction and extending in a vehicle longitudinal direction, and the protrusion portion comprises a fixation portion where the upper end portion is fixed and a terminal end portion separate, in the vehicle longitudinal direction, from the center pillar reinforcement.

According to the present invention, in the vehicle side collision, the side-collision load is inputted to the protrusion portion from the center pillar reinforcement, and the stress concentrates in the terminal end portion which is separate, in the vehicle longitudinal direction, from the center pillar reinforcement, so that the roof rail can be deformed inward in the vehicle width direction at the terminal end portion.

That is, since the roof rail is deformed at the terminal end portion which is offset, in the vehicle longitudinal direction, from the fixation portion, the inward deformation, in the vehicle width direction, of the upper end portion of the center pillar reinforcement can be properly suppressed compared to a case where the roof rail is deformed at the fixation portion due to the rigidity deference with the center pillar reinforcement.

In an embodiment of the present invention, the protrusion portion may be provided at a side face portion of the roof rail.

According to this embodiment, the load which is inputted inward, in the vehicle width direction, from the center pillar reinforcement to the roof rail can be received efficiently.

In another embodiment of the present invention, the present upper vehicle-body structure of the vehicle may be configured such that the protrusion portion extending rearward from the center pillar reinforcement is defined as a first protrusion portion, and another protrusion portion defined as a second protrusion portion protruding in the vehicle width direction is provided at a position of the roof rail which is rearward adjacent to the terminal end portion of the first protrusion portion.

According to this embodiment, the stress concentration can be induced at the terminal end portion of the roof rail. Thus, since the roof rail can be deformed securely at the terminal end portion, the deformation can be suppressed securely by controlling the deformation position of the roof rail precisely.

In another embodiment of the present invention, a bead portion extending in the vehicle width direction may be provided at a portion of an upper face portion or a lower face portion of the roof rail which is located at a position, in the vehicle longitudinal direction, between the first protrusion portion and the second protrusion portion.

According to this embodiment, the stress concentration can be induced at the position between the first protrusion portion and the second protrusion portion. Thus, since the roof rail can be bending-deformed securely at the terminal end portion, the deformation can be suppressed securely by controlling the deformation position of the roof rail precisely.

In another embodiment of the present invention, the present upper vehicle-body structure of the vehicle may be configured such that the bead portion is defined as an upper-face bead portion protruding upward from the upper face portion of the roof rail, a pair of lower-face bead portions extending in the vehicle width direction and protruding downward are provided at the lower face portion of the roof rail, and the pair of lower-face bead portions are located at respective positions, in the vehicle longitudinal direction, adjacent to the first protrusion portion and the second protrusion portion.

According to this embodiment, when the stress concentrates at the position between the first protrusion portion and the second protrusion portion, bending deformation in which the roof rail is projected upward with a causing point positioned between these protrusion portions can be induced.

In another embodiment of the present invention, a roof reinforcement extending inward, in the vehicle width direction, from the roof rail is provided, a door opening portion with a front edge side constituted by the part of the center pillar reinforcement and an upper edge side constituted by part of the roof rail is formed, a corner portion of the door opening portion between the center pillar reinforcement and the roof rail is configured in an arc shape in a side view, the terminal end portion positioned on a rearward side of the fixation portion is positioned on the rearward side of a rear end of the corner portion and on a forward side of a front end of the roof reinforcement which is positioned on the rearward side of and closest to the center pillar reinforcement.

Herein, if the terminal end portion is too close to the fixation portion, the suppression effect of the inward moving, in the vehicle width direction, of the center pillar reinforcement in the vehicle side collision decreases. However, if it is too far from the fixation portion, the load transmission from the fixation portion to the terminal end portion in the side collision is not conducted properly, so that the roof rail cannot be moved (deformed) inward in the vehicle width direction at a demanded position.

According to the above-described embodiment, however, since the stress can be made to concentrate in the terminal end portion in the side collision and thereby the suppression effect of the inward moving, in the vehicle width direction, of the center pillar reinforcement can be increased, so that the roof rail can be deformed securely at the demanded position.

Moreover, the following respective structures are also preferable as an independent embodiment of the present invention.

That is, the terminal end portion which is positioned at a rear end of the first protrusion portion is separate rearward from a rear end of an upper end portion of the center pillar reinforcement. Each of the first protrusion portion and the second protrusion portion is configured to extend straight continuously in the vehicle longitudinal direction and have an elongated circular shape with arc-shaped both side ends thereof. The second protrusion portion is shorter than the first protrusion portion in the longitudinal direction. And, the second protrusion portion is configured to extend in the vehicle longitudinal direction over a front end of a roof reinforcement extending inward, in the vehicle width direction, from the roof rail.

As described above, the upper vehicle-body structure of the vehicle according to the present invention can properly suppress the center pillar reinforcement from coming (moving) in the cabin excessively in the vehicle side collision, without increasing the weight and cost improperly.

The present invention will become apparent from the following description which refers to the accompanying drawings.

DETAILED DESCRIPTION OF THE INVENTION

Figure 1:
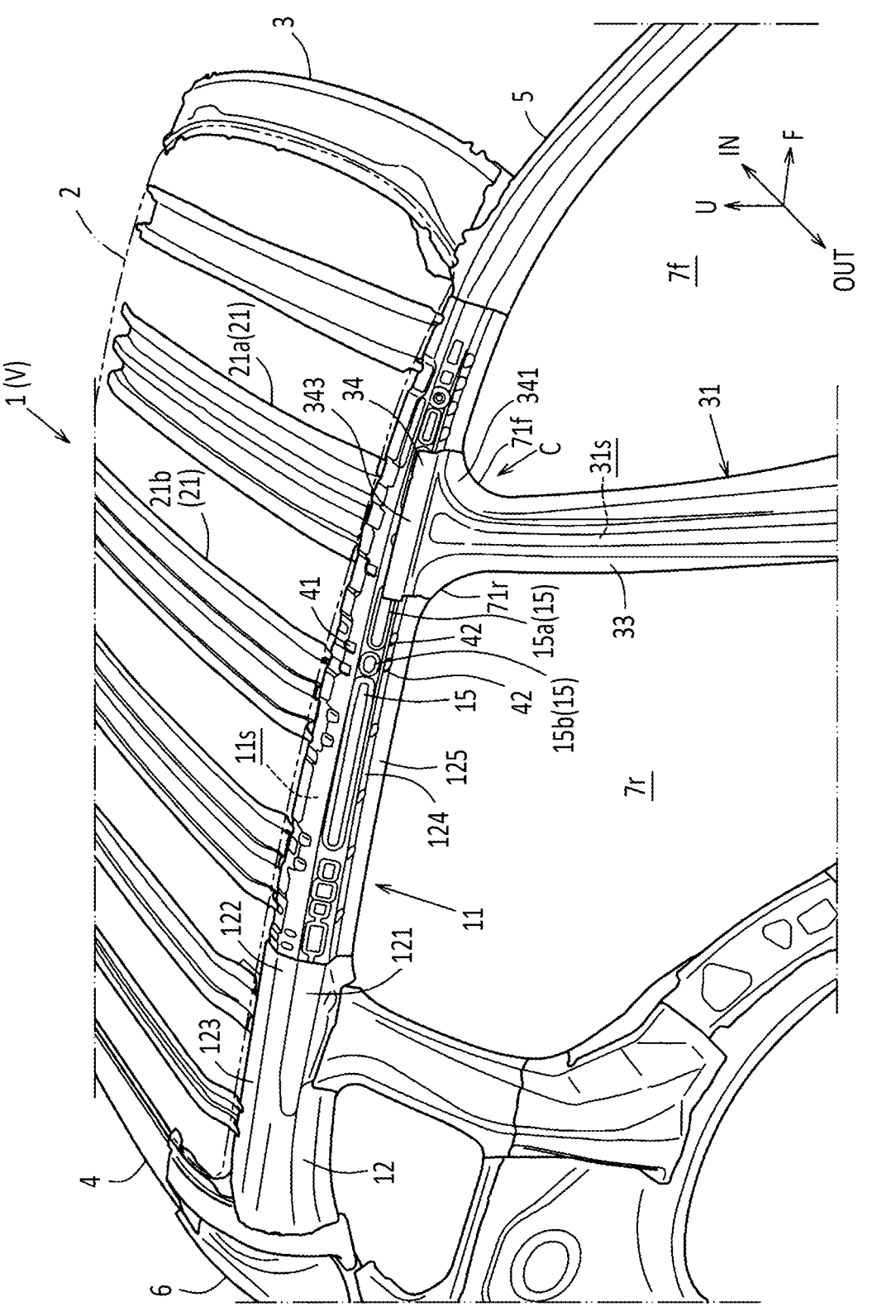
FIG. 1 is a perspective view showing an upper vehicle-body structure of a vehicle of the present embodiment.

Hereafter, an exemplified four-door passenger vehicle V which adopts an upper vehicle-body structure of the present invention will be described specifically referring to the drawings. Herein, the structure of an upper vehicle-body structure 1 of the present embodiment will be described based on a right-side one of the vehicle V. In the figures, an arrow F shows a vehicle forward side, an arrow U shows a vehicle upward side, an arrow OUT shows an outward side, in a vehicle width direction, of the vehicle (cabin outside), an arrow IN shows an inward side, in the vehicle width direction, of the vehicle (cabin inside). Further, a mark "X" denotes a major spot-welding point.

Figure 2:
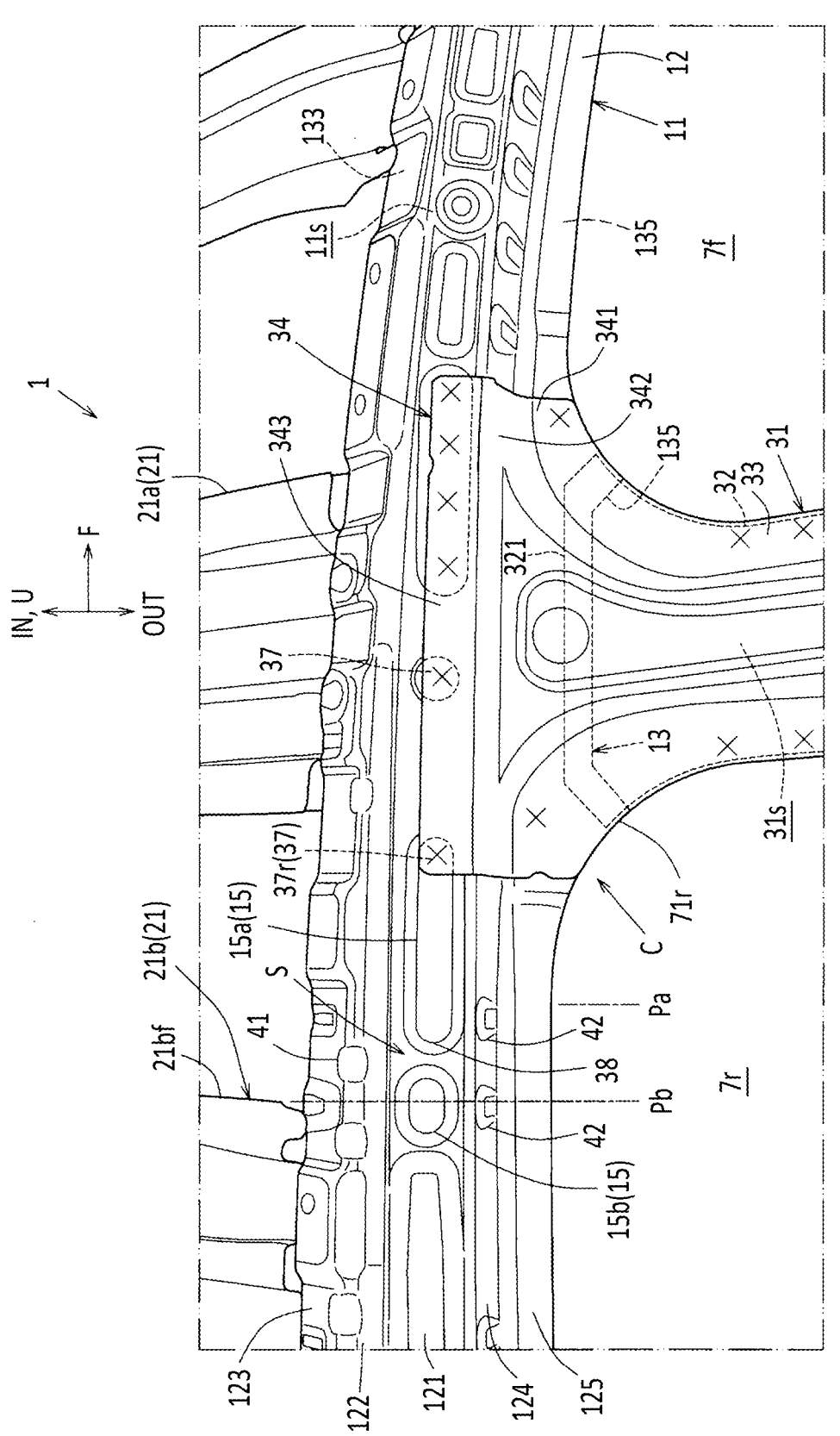
FIG. 2 is a perspective view showing a major part of the upper vehicle-body structure of the present embodiment, when viewed from a right-upper side of the vehicle.

As shown in FIGS. 1 and 2, the upper vehicle-body structure 1 of the vehicle V of the present embodiment comprises a pair of right-and-left roof rails 11 which are provided at its right-and-left both sides, a roof panel 2 (see FIG. 1) which forms a plate-shaped part of a roof of a vehicle body, a front header 3, a roof reinforcement 21 and a rear header 4 which are respectively arranged between the right-and-left roof rails 11 such that they are lined from the vehicle forward side to the vehicle rearward side, and a center pillar 31 which extends downward from each of the right-and-left roof rails 11.

Further, a door opening portion 7f for a front seat and a door opening portion 7r for a rear seat are formed at each side portion of the right-and-left side portions of the vehicle body, the roof rail 11 is provided above the door opening portions 7f, 7r, and the center pillar 31 is provided between the front-seat door opening portion 7f and the rear-seat door opening portion 7r. That is, the front-seat door opening portion 7f has its upper edge side which is constituted by part of the roof rail 11 and its rear edge portion which is constituted by part of the center pillar 31. The rear-seat door opening portion 7r has its upper edge side which is constituted by part of the roof rail 11 and its front edge portion which is constituted by part of the center pillar 31.

As shown in FIGS. 1-4, the roof rail 11, which is also called a roof side rail, is a vehicle-body rigidity member, which forms a closed-cross section extending in a vehicle longitudinal direction at each of both end portions, in the vehicle width direction, of a vehicle-body upper part, and this roof rail 11 is connected to a front pillar 5 at its front side, to a rear pillar 6 at its rear side, and to the center pillar 31 at a central portion, in a longitudinal direction, thereof.

The roof rail 11 comprises a roof rail outer 12 which is positioned on the outward side and a roof rail inner 13 (see FIG. 4) which is positioned on the inward side.

Figure 3:
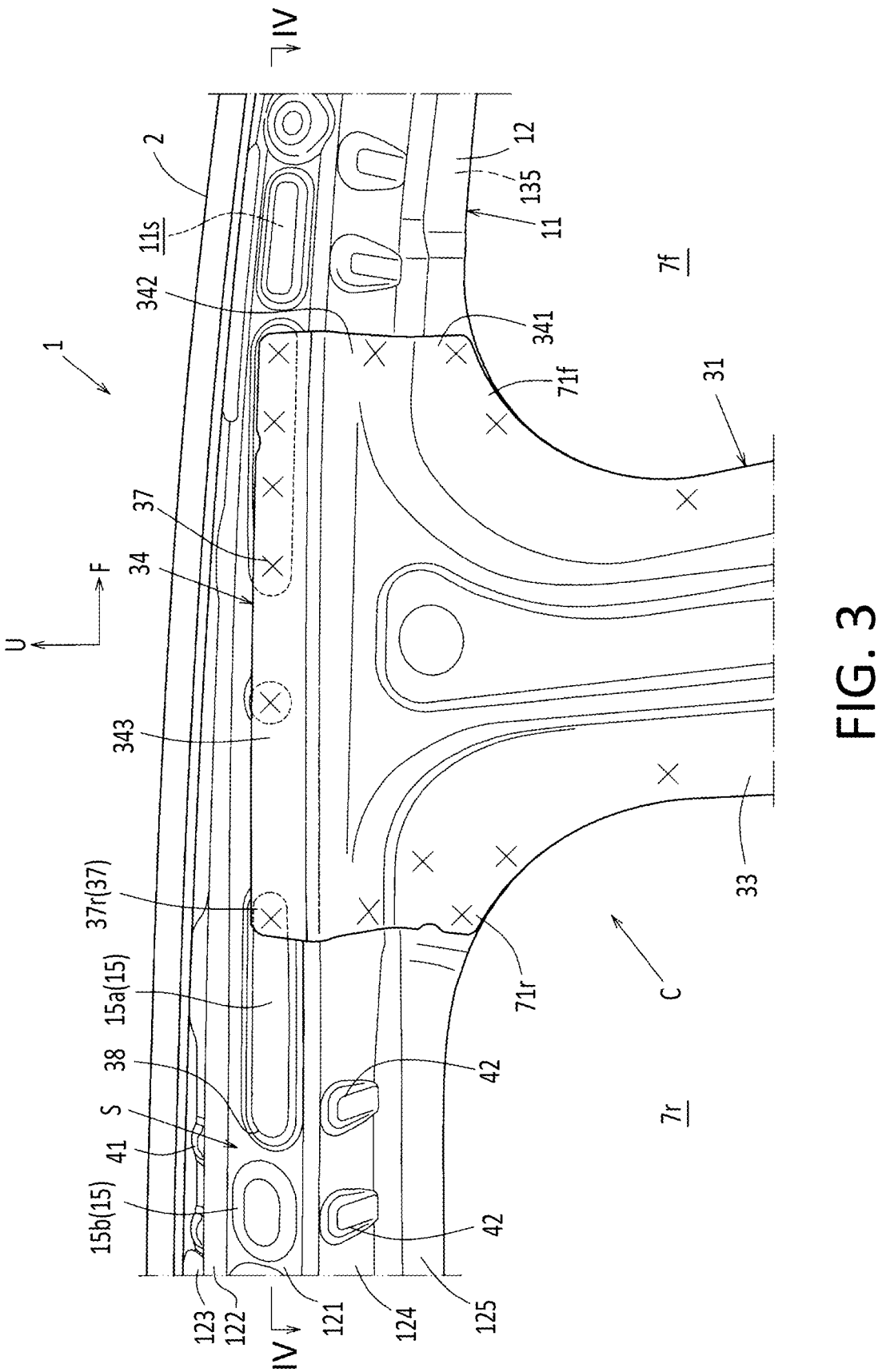
FIG. 3 is a side view showing the major part of the upper vehicle-body structure of the present embodiment.

As shown in FIGS. 1-3, the roof rail outer 12 is configured to have a cross section perpendicular to the vehicle longitudinal direction, which is of a hat shape protruding outward, in the vehicle width direction, thereof and this roof rail outer 12 comprises a side face portion 121 which extends more inward, in the vehicle width direction, thereof as it goes upward, an upper face portion 122 which extends upward-and-inward, in the vehicle width direction, thereof from an upper end of the side face portion 121, an upper-end flange portion 123 which protrudes inward, in the vehicle width direction, thereof from an inward end, in the vehicle width direction, of the upper face portion 122, a lower face portion 124 which extends inward, in the vehicle width direction, thereof from a lower end of the side face portion 121, and a lower-end flange portion 125 which protrudes downward from an inward end, in the vehicle width direction, of the lower face portion 124.

Figure 4:
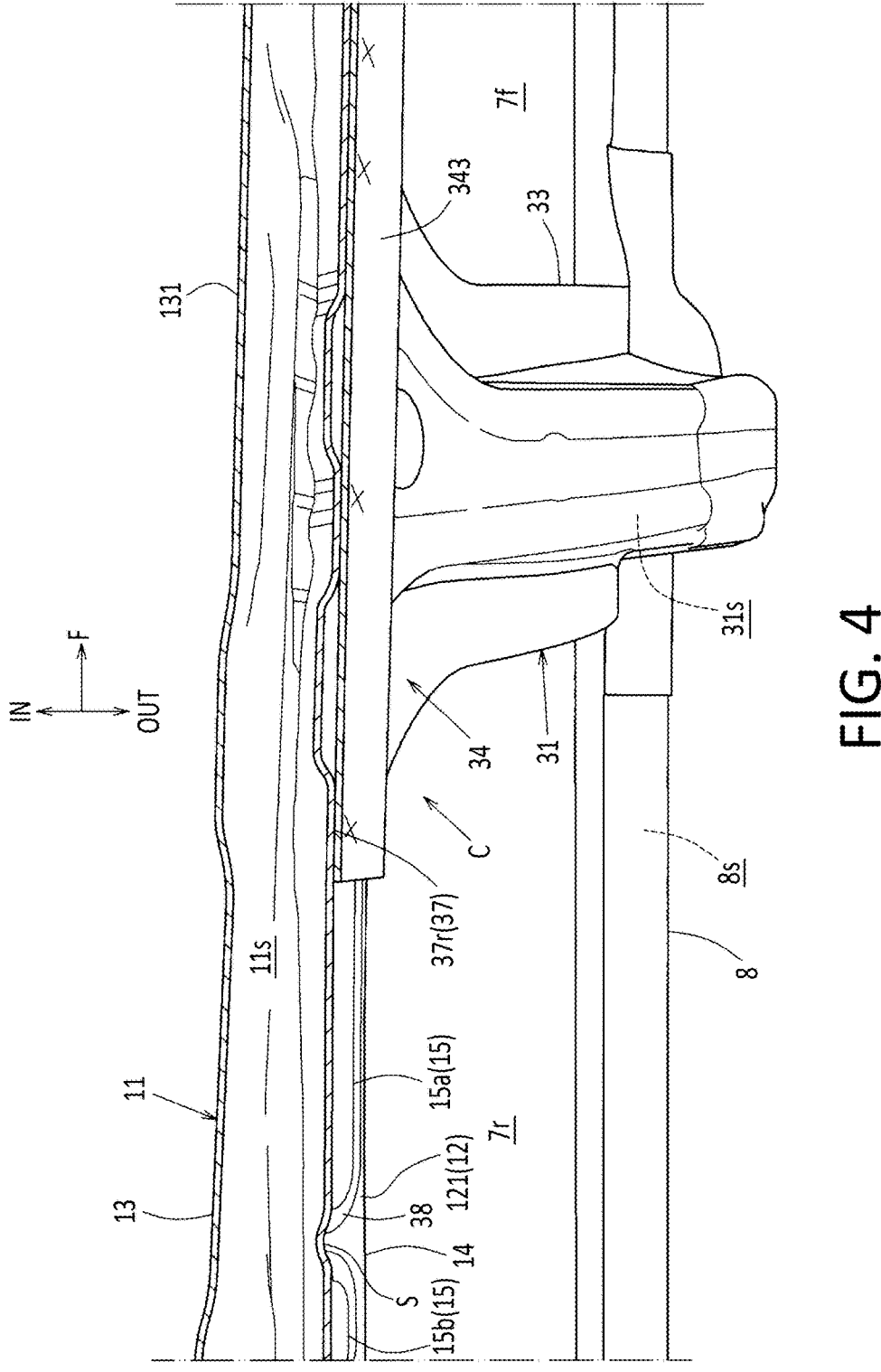
FIG. 4 is a sectional view taken along line A-A of FIG. 3.

The roof rail inner 13 is formed in a roughly flat-plate shape and, as shown in FIGS. 2 and 4, comprises a side face portion 131 (see FIG. 4) which extends more inward, in the vehicle width direction, thereof as it goes upward, an upper-end flange portion 133 (see FIG. 2) which protrudes upward from an upper end of the side face portion 131, and a lower-end flange portion 135 (see FIG. 2) which protrudes downward from a lower end of the side face portion 131.

The roof rail outer 12 and the roof rail inner 13 are arranged such that their upper-end flange portions 123, 133 overlap each other and also their lower-end flange portions 125, 135 overlap each other, and then these portions 123, 133 and these portions 125, 135 are respectively jointly fixed together by spot welding or the like. As shown in FIGS. 1-4, plural protrusion portions 15 which protrude outward, in the vehicle width direction, thereof are provided at the side face portion 121 of the roof rail outer 12. The protrusion portion 15 will be described later.

As shown in FIGS. 1 and 3, the roof panel 2 is a roughly flat-plate shaped member, in a plan view, which is arranged in an area between the pair of right-and-left roof rails 11 so as to cover this area. This roof panel 2 is made of steel or the like. Herein, the roof panel 2 is not illustrated in the other figures than FIGS. 1 and 3.

As shown in FIG. 1, each of the front header 3 and the rear header 4 is a vehicle-body rigidity member, which has a closed-cross section extending in the vehicle width direction. The front header 3 is joined to a front portion of the roof panel 2 and the rear header 4 is joined to a rear portion of the roof panel 2.

The roof reinforcement 21 forms a roof frame of the vehicle body. The roof reinforcement 21 is a member which extends in the vehicle width direction so as to support the roof panel 2 from below, and is provided to extend between the right-and-left roof rails 11. The roof reinforcement 21 consists of plural pieces which are arranged at certain intervals, in the vehicle longitudinal direction, between the front header 3 and the rear header 4.

In the present embodiment, the second roof reinforcement 21 from the front is located at the same position, in the vehicle longitudinal direction, as the center pillar 31 as a middle roof reinforcement 21a.

Herein, one of the roof reinforcements 21 which is positioned on a rearward side of and closest to the center pillar 31, i.e., which is arranged just after the above-described middle roof reinforcement 21a, is defined as a rear-side roof reinforcement 21b. Herein, the above-described middle roof reinforcement 21a of the present invention is not limited to the one like the second roof reinforcement 21 of the present embodiment as long as it is located at the same position, in the vehicle longitudinal direction, as the center pillar 31.

The center pillar 31, which is also called B pillar, extends downward from the roof rail 11 and is joined to a side sill 8 at its lower portion as shown in FIG. 4. Herein, the side sill 8 is a vehicle-body rigidity member, which has a closed-cross section 8s extending in the vehicle longitudinal direction at each of both end portions, in the vehicle width direction, of a vehicle lower part.

As shown in FIGS. 1-4, the center pillar 31 is a vehicle-body rigidity member, which comprises a center pillar outer reinforcement 33 (referred to as the "center pillar outer 33" simply) configured to have a cross section perpendicular to a vertical direction, which is of a hat shape protruding outward, in the vehicle width direction, thereof and a center pillar inner reinforcement 32 (referred to as the "center pillar inner 32" simply) (see FIG. 2) configured in a roughly flat shape, and also has a closed-cross section 31s extending in the vertical direction.

The roof rail 11 and the center pillar 31, i.e., the center pillar outer 33 in the present embodiment, are joined at a joint portion C such that the upper end portion of the center pillar 31 (the center pillar outer 33) crosses the roof rail 11 in a T shape. Specifically, as shown in FIG. 2, an upper end portion 321 of the center pillar inner 32 is provided to overlap the lower-end flange portion 135 of the roof rail inner 13 from the outward side, in the vehicle width direction, thereof at the joint portion C, and this overlapping portion is jointly fixed by spot welding or the like.

As shown in FIGS. 2 and 3, an upper portion 34 of the center pillar outer 33 extends upward beyond the upper end portion 321 of the center pillar inner 32, and is integrally formed by an upper body portion 341, a vertical face portion 342 which extends outward, in the vehicle width direction, thereof from an upper end of the upper body portion 341, and an upper end portion 343 which extends upward from an outward end, in the vehicle width direction, of the vertical face portion 342.

The upper body portion 341 of the center pillar outer 33 is jointly fixed to the lower-end flange portion 125 of the roof rail outer 12 by spot welding or the like. Likewise, the vertical face portion 342 is fixed to the lower face portion 124, and the upper end portion 343 is fixed to the side face portion 121. The upper end portion 343 of the center pillar outer 33 is configured in a flat-plate shape such that it extends in the vehicle longitudinal direction and in the vehicle vertical direction along a whole length, in the vehicle longitudinal direction, of the upper portion 34.

The closed-cross section 31s of the center pillar 31 extends continuously in the vertical direction up to an upper end of the upper body portion 341 of the upper portion 34 of the center pillar outer 33. That is, at the upper portion 34 of the center pillar outer 33, the closed-cross section 31s is formed between the center pillar outer 33 and the roof rail outer 12, not between the center pillar outer 33 and the center pillar inner 32.

Further, the vertical face portion 342 is joined to the lower face portion 124 of the roof rail outer 12 at the upper portion 34 of the center pillar outer 33 as described above. Thereby, the closed-cross section 31s extending in the vertical direction of the center pillar 31 is covered with the lower face portion 124 of the roof rail outer 12 from above.

Moreover, a root (base) portion of the joint portion C where the upper portion (34) of the center pillar 31 is joined to the roof rail 11 is configured to expand more widely, in the longitudinal direction, thereof as it goes upward. Accordingly, each of corner portions 71f, 71r of the door opening portions 7f, 7r between the center pillar 31 and the roof rail 11 is configured in an arc shape in a vehicle side view.

Subsequently, the plural protrusion portions 15 and their surrounding structures at the roof rail outer 12 will be described. As shown in FIGS. 1-3, the plural protrusion portions 15 are arranged in line at intervals (i.e., with a certain gap therebetween) along a roughly whole length, in the longitudinal direction, of the side face portion 121 of the roof rail outer 12. As shown in FIG. 4, each of the plural protrusion portions 15 is configured to protrude in the vehicle width direction and have substantially the same width, in the vertical direction, and the same outward projection length, in the vehicle width direction.

As shown in FIGS. 2 and 4, the plural protrusion portions 15 are also provided at the joint portion C of the side face portion 121 of the roof rail outer 12 to the center pillar outer 33 along the vehicle longitudinal direction. Each of these protrusion portions 15 is configured to have its flat-shaped outside as described above so as to serve as a base portion where the upper end portion 343 of the center pillar outer 33 is joined to the side face portion 121.

Further, as shown in FIGS. 2 and 4, the upper end portion 343 of the center pillar outer 33 is configured to contact the plural protrusion portions 15 of the side face portion 121 of the roof rail outer 12 from the outward side, in the vehicle width direction, thereof at the joint portion C, and then fixedly joined to the side face portion 121 of the roof rail outer 12 by spot welding or the like as described above (see the mark "X" in the figures). This fixation portion 37 consists of plural points which are positioned in the longitudinal direction of the upper end portion 343.

Herein, the protrusion portion 15 which is located at the rearmost position among the plural protrusion portions 15 at the joint portion C is defined as a first protrusion portion 15a. This first protrusion portion 15a is positioned at a rear portion of the upper end portion 34 of the center pillar outer 33 at its front end, and a rear-side fixation portion 37r which is located at the rearmost position among the plural fixation portions 37 is positioned at the front end of the first protrusion portion 15a.

The first protrusion portion 15a extends rearward from a rear end of the upper end portion 343 of the center pillar outer 33. Thereby, an terminal end portion 38 which is positioned at a rear end of the first protrusion portion 15a is separate rearward from the rear end of the upper end portion 343 of the center pillar outer 33.

Specifically, as shown in FIG. 2, the terminal end portion 38 of the first protrusion portion 15a is located at a position Pa of a rear end of the corner portion 71r of the center pillar 31 and the roof rail 11 at the rear-seat door opening portion 7r in the longitudinal direction of the roof rail 11, and also this terminal end portion 38 is positioned on the forward side of a front-end position Pb of the rear-side roof reinforcement 21b.

Further, as shown in FIGS. 1-4, the protrusion portion 15 among the plural protrusion portions 15 which is rearward adjacent (close) to the terminal end portion 38 of the first protrusion portion 15a is defined as a second protrusion portion 15b. In the present embodiment, each of the first protrusion portion 15a and the second protrusion portion 15b is configured to extend straight continuously in the vehicle longitudinal direction and have an elongated circular shape with its arc-shaped both side ends. Moreover, the first protrusion portion 15a and the second protrusion portion 15b are arranged with a gap s, which does not protrude outward, in the vehicle width direction, thereof, formed between them 15a, 15b in the longitudinal direction. Herein, the terminal end portion 38 of the first protrusion portion 15a is a ridgeline (a step portion) which is positioned at a border of the first protrusion portion 15a and the gap s and formed along the arch-shaped rear end of the first protrusion portion 15a, where a rigidity difference occurs in the vehicle longitudinal direction.

While the terminal end portion 38 of the first protrusion portion 15a and the front end of the second protrusion portion 15b are configured to be separate from each other in the longitudinal direction with the gap s in the present embodiment, these portions may be configured to contact directly at a contact point with no gap.

In the present embodiment, the second protrusion portion 15b is shorter than the first protrusion portion 15a in the longitudinal direction, but, as shown in FIG. 2, it extends over a front end 21bf of the rear-side roof reinforcement 21b in the vehicle longitudinal direction. Hence, in the present embodiment, not only the terminal end portion 38 of the first protrusion portion 15a but also the gap s between the first protrusion portion 15 and the second protrusion portion 15b are positioned on the forward side of the front-end position Pb of the rear-side roof reinforcement 21b.

Further, as shown in FIGS. 1-3, an upper-face bead portion 41 which protrudes upward and extends in the vehicle width direction is provided at an upper face portion 122 of the roof rail 11. This upper-face bead portion 41 is provided at the same position as the gap s between the first protrusion portion 15a and the second protrusion portion 15b in the longitudinal direction of the upper face portion 122 of the roof rail 11.

Moreover, a lower-face bead portion 42 which protrudes downward and extends in the vehicle width direction is provided at a lower face portion 124 of the roof rail 11. This lower-face bead portion 42 consists of a pair of bead portions 42, which are located at respective positions, in the longitudinal direction of the upper face portion 122 of the roof rail 11, which are adjacent to the first protrusion portion 15a and the second protrusion portion 15b.

The above-described upper vehicle-body structure 1 of the vehicle comprises, as shown in FIGS. 1-4, the center pillar outer 33 and the roof rail 11, to which the upper end portion 343 of the center pillar outer 33 is fixed, wherein the roof rail 11 comprises the protrusion portion 15 protruding in the vehicle width direction and extending in the vehicle longitudinal direction, and the protrusion portion 15 comprises the rear-side fixation portion 37r where the upper end portion 343 is fixed and the terminal end portion 38 separate, in the vehicle longitudinal direction, from the center pillar outer 33.

According to this structure, the center pillar outer 33 can be properly suppressed from coming in the cabin in the vehicle side collision, without increasing the weight and cost improperly. Specifically, in order to suppress this coming-in properly, it is necessary to conduct the efficient load dispersing to the opposite side of the vehicle body when the collision load is inputted to the center pillar 31. However, the stress generally tends to concentrate in the joint portion C of the center pillar 31 to the roof rail 11 due to the rigidity difference between these members 31, 11. Accordingly, there is a concern that it may become difficult to conduct the above-described efficient load dispersing to the opposite side of the vehicle body.

In particular, in a vehicle in which a central side of a roof top is offset, in a vehicle height direction, from both sides, in the vehicle width direction, thereof, its roof reinforcement 21 also tends to be curved such that its central side is offset, in the vertical direction, from both sides, in the vehicle width direction, thereof. In this vehicle's case, when the side-collision load is inputted, upward-bending deformation is induced at the roof reinforcement 21 and thereby the efficient load disperse to the vehicle side by means of the roof reinforcement 21 is not conducted properly, so that there is a concern that the center pillar 31 may come in the cabin improperly largely.

According to the structure of the present embodiment, however, in the vehicle side collision, the side-collision load is inputted to the first protrusion portion 15a of the roof rail 11 from the center pillar outer 33 and transmitted rearward along the first protrusion portion 15a. Further, the stress concentrates in the terminal end portion 38 which is separate, in the vehicle longitudinal direction, from the center pillar outer 33 (see FIG. 6B described later), so that the roof rail 11 can be deformed inward, in the vehicle width direction, thereof at the terminal end portion 38.

Figures 5A, 5B:
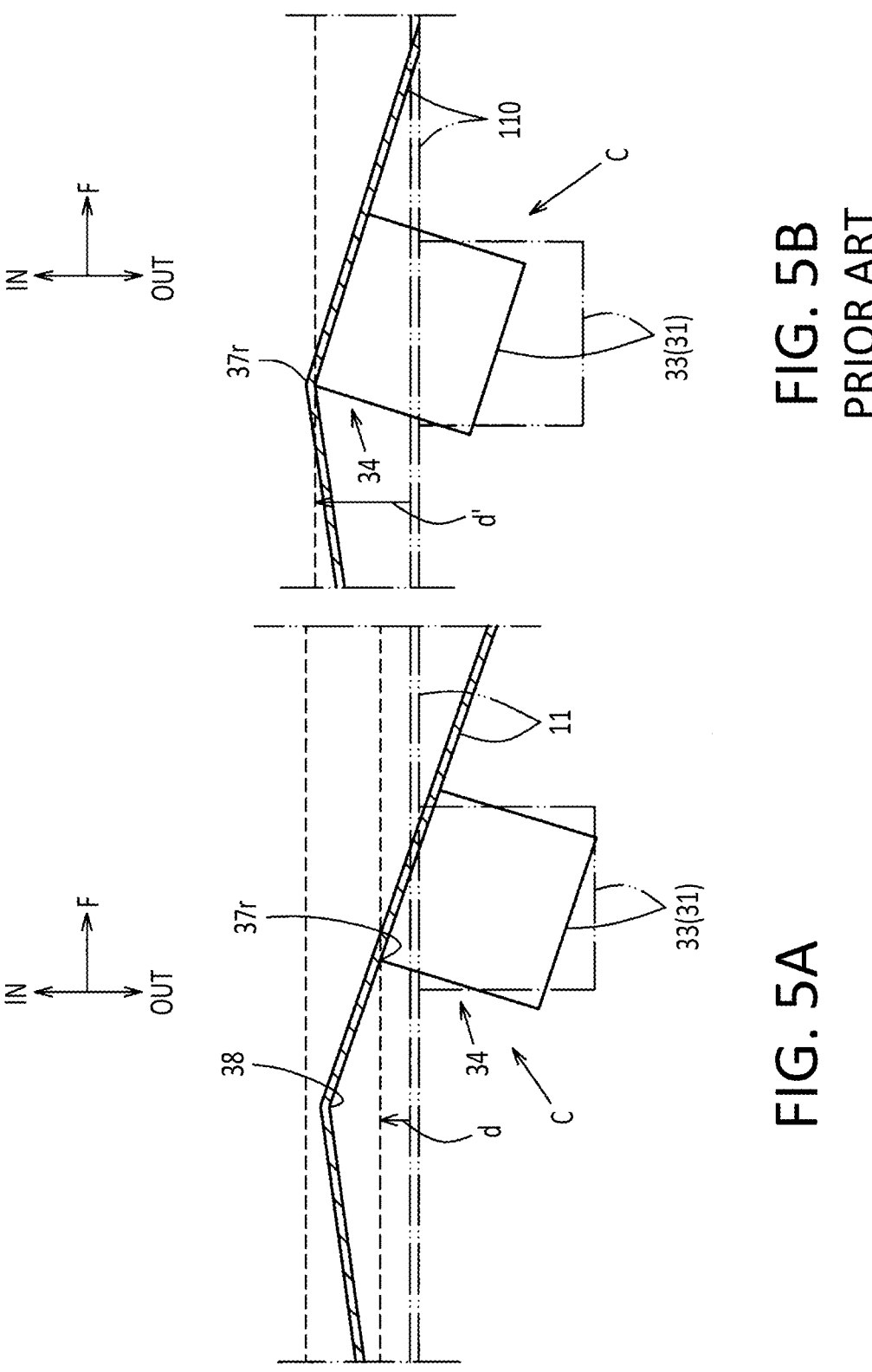
FIG. 5A is a vertical-direction perpendicular sectional view schematically showing a manner of deformation of a roof rail of the present embodiment.
FIG. 5B is a vertical-direction perpendicular sectional view schematically showing a manner of deformation of a conventional roof rail in a vehicle side collision.

That is, according to the present embodiment shown in FIG. 5A, since the roof rail 11 is deformed at the terminal end portion 38 which is offset, in the vehicle longitudinal direction, from the rear-side fixation portion 37r, the inward deformation (a deformation degree d), in the vehicle width direction, of the upper end portion 34 of the center pillar 31 can be properly suppressed compared to a case shown in FIG. 5B where the roof rail 11 is deformed (a deformation degree d') at the rear-side fixation portion 37r due to the rigidity deference with the center pillar outer 33 (d<d').

Herein, FIG. 5A is a vertical-direction perpendicular sectional view schematically showing a manner of the deformation of the roof rail 11 of the present embodiment, and FIG. 5B is a vertical-direction perpendicular sectional view schematically showing a manner of the deformation of the conventional roof rail in the vehicle side collision.

Thus, according to the present embodiment, the center pillar outer 33 can be suppressed from coming in the cabin by controlling a position of bending deformation of the roof rail 11 in the vehicle side collision more properly without increasing the weight and cost, compared to a case where the joint portion C is reinforced firmly enough to avoid bending deformation of the roof rail 11 at the joint portion C.

In the embodiment of the present invention, as shown in FIGS. 1-4, the first protrusion portion 15a is provided at the side face portion 121 on the outward side, in the vehicle width direction, of the roof rail 11.

According to this structure, the load which is inputted inward in the vehicle width direction from the center pillar 31 to the roof rail 11 can be received efficiently.

In the embodiment of the present invention, as shown in the same figures, the protrusion portion 15 extending rearward from the center pillar 31 is defined as the first protrusion portion 15a, and the second protrusion portion 15b protruding in the vehicle width direction is provided at the position of the roof rail 11 which is rearward adjacent to the terminal end portion 38 of the first protrusion portion 15a.

According to this structure, the collision load which is inputted to the rear-side fixation portion 37r of the roof rail 11 from the center pillar outer 33 and then transmitted to the terminal end portion 38 from the rear-side fixation portion 37r in the vehicle side collision is not easily dispersed rearward beyond the terminal end portion 38, so that stress concentration can be induced at the terminal end portion 38 of the roof rail 11.

Thus, since the roof rail 11 can be deformed securely at the terminal end portion 38, the deformation can be suppressed securely by controlling the deformation position of the roof rail 11 precisely.

In the embodiment of the present invention, as shown in FIG. 2, the upper-face bead portion 41 extending in the vehicle width direction is provided at a portion of the upper face portion 122 of the roof rail 11 which is located at the position s, in the vehicle longitudinal direction, between the first protrusion portion 15a and the second protrusion portion 15b.

According to this structure, since the rigidity difference occurs at the portion of the upper face portion 122 of the roof rail 11 which is located, in the vehicle longitudinal direction, between the first protrusion portion 15a and the second protrusion portion 15b as well, the stress concentration can be also induced in the vehicle width direction.

Thus, the roof rail 11 can be bending-deformed securely at the terminal end portion 38. That is, the deformation can be suppressed securely by controlling the bending-deformation position of the roof rail 11 precisely.

In the embodiment of the present invention, as shown in FIGS. 2 and 3, the pair of lower-face bead portions 42 extending in the vehicle width direction and protruding downward are provided at the lower face portion 124 of the roof rail 11, and the pair of lower-face bead portions 42 are located at the respective positions, in the vehicle longitudinal direction, adjacent to the first protrusion portion 15a and the second protrusion portion 15b.

According to this structure, when the stress concentrates in the gap s between the first protrusion portion 15a and the second protrusion portion 15b, bending deformation in which the roof rail 11 is projected upward with a causing point of the gap s between these protrusion portions 15a, 15b can be induced.

In the embodiment of the present invention, as shown in FIG. 2, the roof reinforcement 21 extending inward, in the vehicle width direction, from the roof rail 11 is provided, the rear-seat door opening portion 7r with the front edge side constituted by the part of the center pillar reinforcement 31 and the upper edge side constituted by the part of the roof rail 11 is formed, the corner portion 71r of the door opening portion 7r between the center pillar 31 and the roof rail 11 is configured in the arc shape in the side view, the terminal end portion 38 is positioned on the rearward side of the rear-end position Pa of the corner portion 71r (i.e., the position Pa at the corner R of the center pillar outer 33) and on the forward side of the front-end position Pb of the rear-side roof reinforcement 21b which is positioned on the rearward side of and closest to the center pillar 31.

Figure 7A:
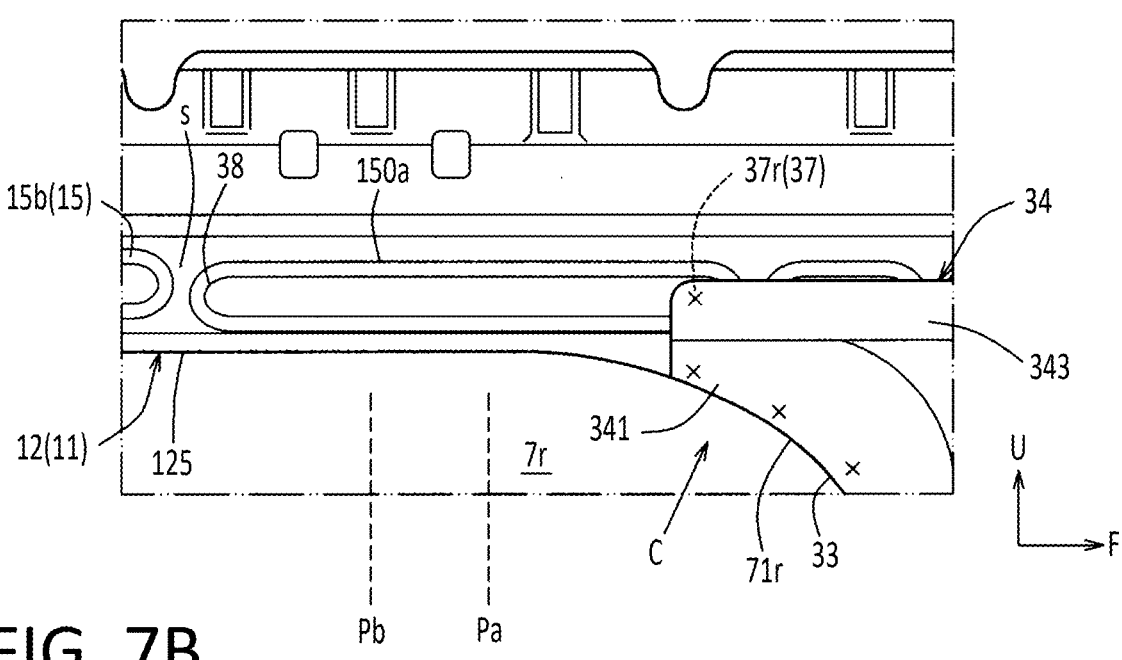
FIG. 7A is a side view schematically showing around a joint portion of the conventional roof rail before the vehicle side collision.
Figure 7B:
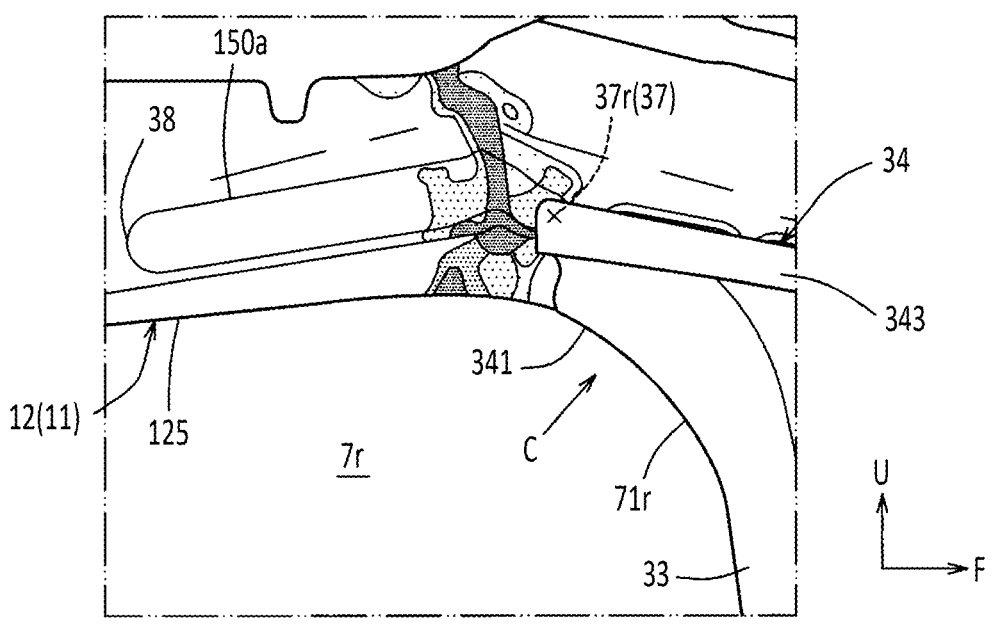
FIG. 7B is a side view schematically showing results of simulation analysis of a move around the joint portion of the conventional roof rail in the vehicle side collision.

Specifically, if the terminal end portion 38 is too close to the rear-side fixation portion 37r, the suppression effect of the inward moving, in the vehicle width direction, of the center pillar 31 decreases. Meanwhile, if the terminal end portion 38 is too far from the rear-side fixation portion 37r as shown in FIG. 7A, the load transmission along the protrusion portion 150a is not conducted properly, so that the roof rail 11 is deformed improperly at its intermediate position between the rear-side fixation portion 37r and the terminal portion 38 as shown in FIG. 7B. Consequently, the proper deformation of the roof rail 11 at the terminal portion 38 (i.e., at a demanded position) cannot be induced.

Figure 6A:
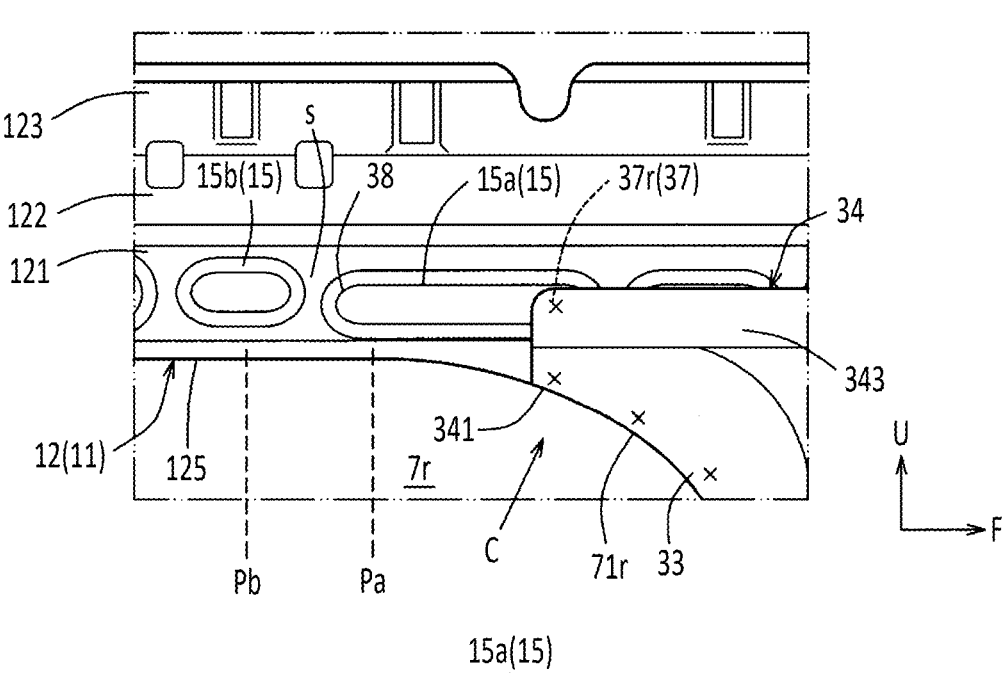
FIG. 6A is a side view schematically showing around a joint portion of the roof rail of the present embodiment before the vehicle side collision.
Figure 6B:
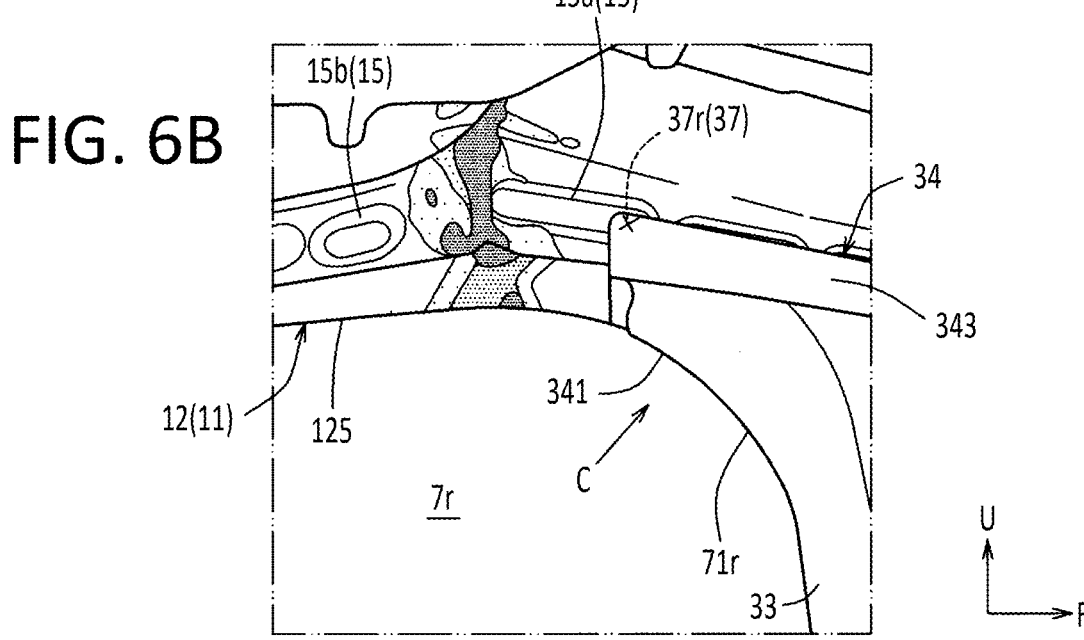
FIG. 6B is a side view schematically showing results of simulation analysis of a move around the joint portion of the roof rail of the present embodiment in the vehicle side collision.

However, according to the present embodiment shown in FIG. 6A which is configured such that the terminal end portion 38 is positioned on the rearward side of the rear-end position Pa of the corner portion 71*r* and on the forward side of the front-end position Pb of the rear-side roof reinforcement 21*b*, as shown in FIG. 6B the stress can be made to concentrate in the terminal end portion 38 in the side collision and thereby the roof rail 11 can be deformed securely at the demanded position where the high suppression effect of the inward moving, in the vehicle width direction, of the center pillar 31 is provided. Thus, the inward-moving of the center pillar 31 in the side collision can be suppressed properly.

Herein, in FIGS. 6B and 7B, an area where the stress concentration occurs when the roof rail 11 is bending-deformed in the side collision is shown by dots, which are illustrated with a degree of darkness (denseness) in accordance of the magnitude of the stress concentration occurring.

In correspondence of the present invention to the above-described embodiment, the door opening portion for the rear seat corresponds to the door opening portion 7*r*. Likewise, the center pillar reinforcement corresponds to the center pillar outer reinforcement 33, the fixation portion corresponds to the rear-side fixation portion 37*r*, the roof reinforcement corresponds to the rear-side roof reinforcement 21*b*, the side face portion of the roof rail corresponds to the side face portion 121 of the roof rail outer 12, the upper face portion of the roof rail corresponds to the upper face portion 122 of the roof rail outer 12, the lower face portion of the roof rail corresponds to the lower face portion 124 of the roof rail outer 12, and the position between the first protrusion portion and the second protrusion portion corresponds to the gap s. However, the present invention is not limited to the above-described embodiment but any other modifications of the present embodiment are applicable.

For example, while the above-described embodiment is configured such that the upper-face bead portion 41 is provided at the upper face portion 122 of the roof rail 11 and also a pair of lower-face bead portions 42 are provided at the lower face portion 124 of the roof rail 11, the upper-face bead portion 41 may not be provided at the upper face portion 122 and only the lower-face bead portion 42 may be provided at the lower face portion 124 of the roof rail 11. In this case, it is preferable that the lower-face bead portion 42 be provided at the same position on the lower face portion 124 of the roof rail 11, in the longitudinal direction, as the gap s between the first protrusion portion 15*a* and the second protrusion portion 15*b* in order to properly induce the deformation of the roof rail 11 at the terminal end portion 38.

What is claimed is:

1. An upper vehicle-body structure of a vehicle, comprising:
 a roof rail; and
 a center pillar reinforcement comprising an upper end portion fixed to said roof rail,
 wherein said roof rail comprises a protrusion portion protruding in a vehicle width direction and extending in a vehicle longitudinal direction, and said protrusion portion comprises a fixation portion, said upper end portion fixed to said fixation portion, and a terminal end portion spaced apart from said center pillar reinforcement in the vehicle longitudinal direction,
 wherein said protrusion portion extends rearward from said center pillar reinforcement and is defined as a first protrusion portion, and another protrusion portion defined as a second protrusion portion protruding in the vehicle width direction is provided at a position of said roof rail which is adjacent to and rearward of said terminal end portion of the first protrusion portion in the vehicle longitudinal direction.

2. The upper vehicle-body structure of the vehicle of claim 1, wherein said protrusion portion is provided at a side face portion of said roof rail.

3. The upper vehicle-body structure of the vehicle of claim 1, wherein a bead portion extending in the vehicle width direction is provided at a portion of an upper face portion or a lower face portion of said roof rail which is located at a position, in the vehicle longitudinal direction, between said first protrusion portion and said second protrusion portion.

4. The upper vehicle-body structure of the vehicle of claim 3, wherein said bead portion is defined as an upper-face bead portion protruding upward from the upper face portion of said roof rail and a pair of lower-face bead portions extending in the vehicle width direction and protruding downward from the lower face portion of the roof rail, wherein said pair of lower-face bead portions are located at respective positions, in the vehicle longitudinal direction, adjacent to said first protrusion portion and said second protrusion portion.

5. The upper vehicle-body structure of the vehicle of claim 1, wherein said terminal end portion is positioned at a rear end of said first protrusion portion and is spaced apart rearwardly in the vehicle longitudinal direction from a rear end of an upper end portion of said center pillar reinforcement.

6. The upper vehicle-body structure of the vehicle of claim 1, wherein each of said first protrusion portion and said second protrusion portion is configured to extend straight continuously in the vehicle longitudinal direction and have an obround shape.

7. The upper vehicle-body structure of the vehicle of claim 1, wherein said second protrusion portion is shorter than said first protrusion portion in the longitudinal direction.

8. The upper vehicle-body structure of the vehicle of claim 1, wherein said second protrusion portion is configured to extend in the vehicle longitudinal direction rearwardly past a front end of a roof reinforcement extending inward, in the vehicle width direction, from said roof rail.

9. An upper vehicle-body structure of a vehicle, comprising:
 a roof rail;
 a center pillar reinforcement comprising an upper end portion fixed to said roof rail,
 wherein said roof rail comprises a protrusion portion protruding in a vehicle width direction and extending in a vehicle longitudinal direction, and said protrusion portion comprises a fixation portion, said upper end portion fixed to said fixation portion, and a terminal end portion spaced apart from said center pillar reinforcement in the vehicle longitudinal direction,
 a roof reinforcement extending inward, in the vehicle width direction, from said roof rail, said roof reinforcement positioned on the rearward side of and closest to the center pillar reinforcement; and
 a door opening portion with a front edge side constituted by part of said center pillar reinforcement and an upper edge side constituted by part of said roof rail;
 wherein
 a corner portion of said door opening portion between the center pillar reinforcement and the roof rail is configured in an arc shape in a side view; and
 said terminal end portion positioned on a rearward side of said fixation portion is positioned on the rearward side of a rear end of said corner portion and on a forward side of a front end of the roof reinforcement.

* * * * *